US00RE43682E

(19) United States
(12) Reissued Patent
Chiang

(10) Patent Number: US RE43,682 E
(45) Date of Reissued Patent: Sep. 25, 2012

(54) PRESSURE-ADJUSTABLE MECHANISM FOR PAPER FEEDING ROLLER OF AUTOMATIC PAPER FEEDER

(75) Inventor: Shu-Ya Chiang, Taichung (TW)

(73) Assignee: Transpacific Systems, LLC, Wilmington, DE (US)

(21) Appl. No.: 11/150,600

(22) Filed: Jun. 9, 2005

Related U.S. Patent Documents

Reissue of:

(64) Patent No.: 6,575,453
Issued: Jun. 10, 2003
Appl. No.: 09/985,713
Filed: Nov. 6, 2001

(51) Int. Cl.
*B65H 3/52* (2006.01)

(52) U.S. Cl. ..... 271/124; 271/125; 271/126; 271/127; 271/160; 271/167

(58) Field of Classification Search ..... 271/124, 271/125, 126, 127, 160, 167, 117
See application file for complete search history.

(56) References Cited

U.S. PATENT DOCUMENTS

| | | | | |
|---|---|---|---|---|
| 3,730,516 | A * | 5/1973 | Debray | 271/147 |
| 4,147,341 | A * | 4/1979 | Wurscher et al. | 271/122 |
| 4,212,456 | A * | 7/1980 | Ruenzi | 271/4.04 |
| 4,394,009 | A * | 7/1983 | Bergman et al. | 271/10.12 |
| 4,726,698 | A * | 2/1988 | Weiss et al. | 400/629 |
| 5,377,970 | A * | 1/1995 | Kikuchi | 271/121 |
| 5,391,009 | A * | 2/1995 | Stodder | 400/605 |
| 5,951,002 | A * | 9/1999 | Yokota | 271/117 |
| 6,126,161 | A * | 10/2000 | Kato | 271/121 |
| 6,331,002 | B1 * | 12/2001 | Yoshino et al. | 271/117 |

FOREIGN PATENT DOCUMENTS

JP 06179538 A * 6/1994

* cited by examiner

*Primary Examiner* — Jeremy R Severson
(74) *Attorney, Agent, or Firm* — Stolowitz Ford Cowger LLP

(57) ABSTRACT

An automatic paper feeder for an image-scanning device with a pressure-adjustable mechanism for adjusting the paper feeding roller of the automatic paper feeder is disclosed. A pressure from paper sheets stacked on a paper tray of the automatic paper feeder is detected by a paper tray pressure detecting mechanism and transferred to a roller pressure adjusting mechanism to change a pressure between the paper feeding roller and a paper separating plate and adjust a feeding angle of the movable paper tray.

24 Claims, 6 Drawing Sheets

PRESSURE-ADJUSTABLE MECHANISM FOR PAPER FEEDING ROLLER OF AUTOMATIC PAPER FEEDER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an automatic paper feeder for an image-scanning device, and more particularly to a pressure-adjustable mechanism for the paper feeding roller of the automatic paper feeder.

2. Description of the Prior Art

An automatic paper feeder is frequently included in various kinds of office automation equipment, such as image-scanning device, photocopier, printer, etc., so that paper sheets to be scanned, copied or printed could be automatically separated and fed via the automatic paper feeder. FIG. 1 illustrates a scanner 1 and a conventional automatic paper feeder 2 associated therewith. The scanner 1 is internally provided with an optical scanning module 11, a pair of guide bars 12, and related optical components, such as focusing lens, image sensor, driving mechanism, etc. The optical scanning module 11 is moved along the guide bars 12 under control of a control circuit of the scanner 1, and a sheet of paper 3 to be scanned is fed with the automatic paper feeder 2 for image scanning.

FIG. 2 shows an internal structure of the automatic paper feeder 2 of FIG. 1. The automatic paper feeder 2 mainly includes a paper tray 21, a paper feeding roller 22, a paper pressing plate 23, a stopping plate 24, a paper separating mechanism 25, and a paper separating plate 26. Paper sheets 3 to be fed are stacked on the paper tray 21 and held in place under a pressure applied by the paper pressing plate 23 on the paper sheets 3. Meanwhile, lower ends of the stacked paper sheets 3 are positioned against the stopping plate 24. A main function of the paper separating mechanism 25 is to provide a proper gap between the stopping plate 24 and the paper feeding roller 22 and to apply a proper pressure against the paper separating plate 26.

When the paper feeding roller 22 rotates, it brings a lowermost sheet of paper 3 in the paper tray 21 to move in a direction indicated by arrow I toward the gap between the paper feeding roller 22 and the paper separating plate 26. In the event two or more sheets of paper 3 are fed toward the gap, a difference between the friction coefficients of the paper-feeding roller 22 and the paper separating plate 26 would allow only the paper in contact with the paper feeding roller 22 to move through the gap. Therefore, the stacked paper sheets 3 could be separately fed for scanning one by one.

Conventionally, the paper tray 21 is a fixed-type structure. That is, the paper tray 21 is always fixedly mounted in the automatic paper feeder 2 independent of the quantity of paper sheet 3 on the paper tray 21. Meanwhile, the gap between the paper feeding roller 22 and the paper separating plate 26 is always constant, too. It is found, however, in actual operation of the conventional automatic paper feeder 2 having fixed paper tray 21, increased weight or amount of paper sheets 3 on the paper tray 21 would often have influences on accurate paper dispensing of the automatic paper feeder 2. Problems such as difficult paper feeding and paper dispensing occur when the weight or the amount of paper sheets 3 on the paper tray 21 increases.

SUMMARY OF THE INVENTION

It is therefore a primary object of the present invention to provide a pressure-adjustable mechanism for paper feeding roller in an automatic paper feeder, so that a pressure from the paper feeding roller is automatically adjusted when there is an increased amount of paper sheets stacked on the paper tray of the automatic paper feeder, and that an accurate paper dispensing is maintained.

Another object of the present invention is to provide a movable pressure-adjustable mechanism for paper feeding roller in an automatic paper feeder, wherein the pressure-adjustable mechanism could be actuated by an overall weight or number of paper sheets stacked on a movable paper tray to automatically adjust a pressure from the paper feeding roller for dispensing the paper sheets.

A further object of the present invention is to provide a self-adjustable pressure-adjustable mechanism for paper feeding roller in an automatic paper feeder, wherein a movable paper tray is pivotally lowered due to a weight of paper sheets stacked thereon and thereby lifts the paper feeding roller by a proper distance and adjusts a paper feeding angle of the paper tray as well as a frictional pressure between the paper feeding roller and a paper separating plate, so that good paper dispensing effect could be maintained.

To achieve the above and other objects, the structure according to the present invention mainly includes a pressure-adjustable mechanism for adjusting the paper feeding roller of the automatic paper feeder with respect to the paper separating mechanism of the automatic paper feeder. A pressure from paper sheets stacked on a paper tray of the automatic paper feeder is detected by a paper tray pressure detecting mechanism and transferred to a roller pressure adjusting mechanism to change a pressure between the paper feeding roller and a paper separating plate and adjust a feeding angle of the movable paper tray.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
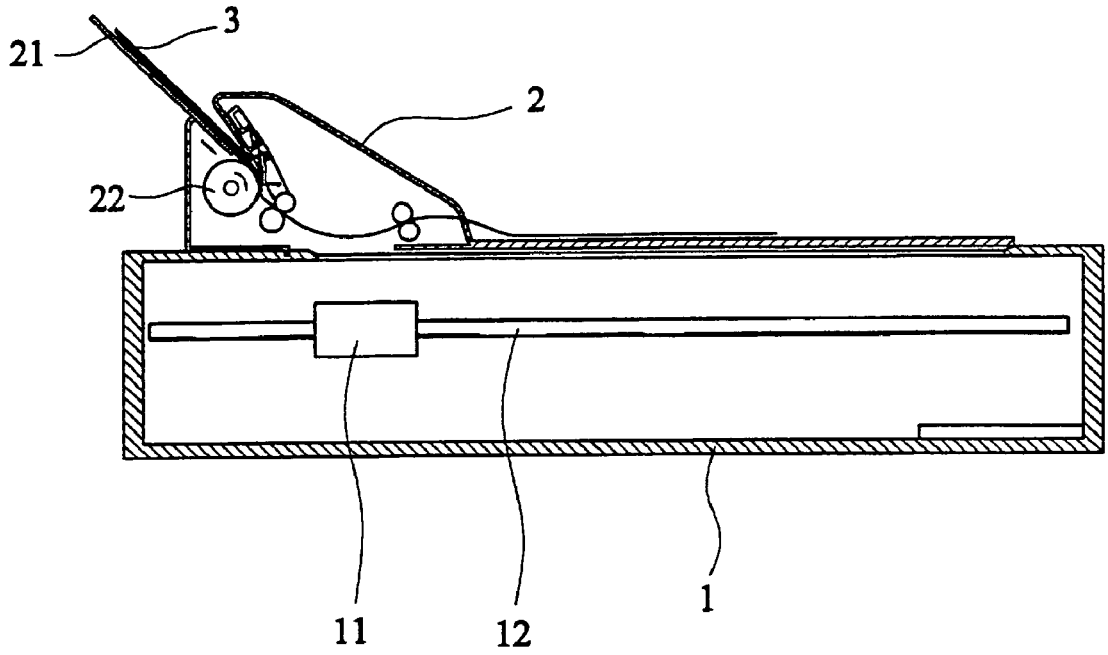
FIG.1(Prior Art)
FIG. 1 is a sectioned side view of a scanner and a conventional automatic paper feeder associated with the scanner.
Figure 2:
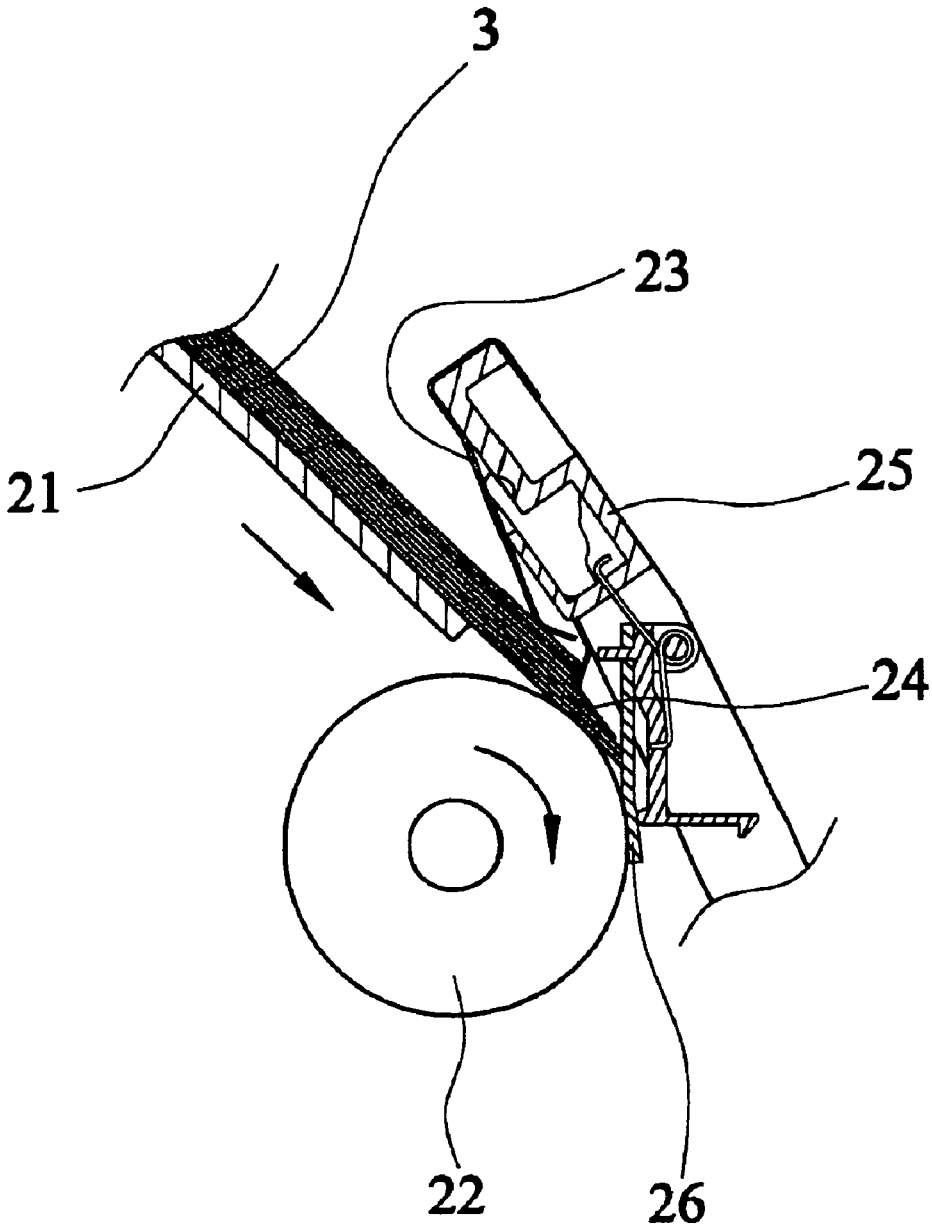
FIG.2(Prior Art)
FIG. 2 is an enlarged and sectioned side view of the automatic paper feeder of FIG. 1, in which a fixed-type paper tray is provided.
Figure 3:
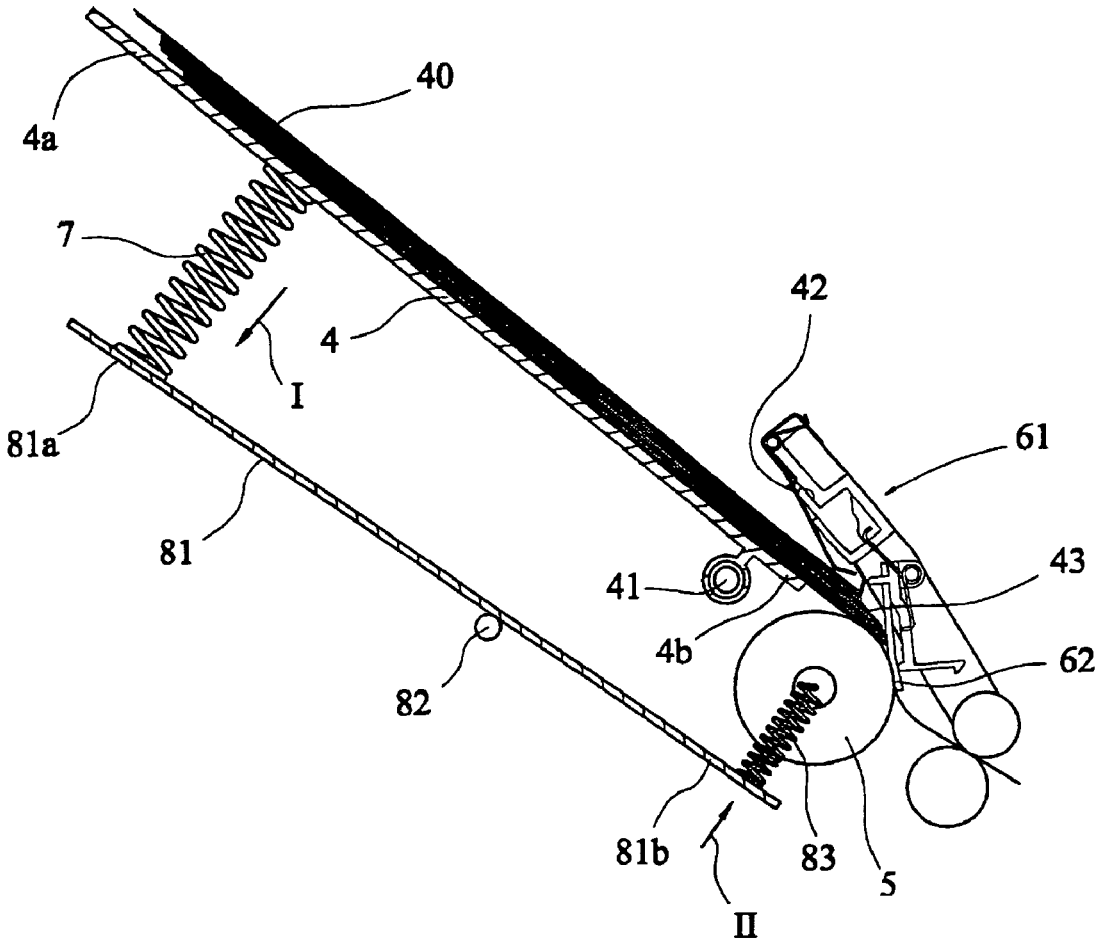
FIG. 3 is a sectioned side view of a pressure-adjustable mechanism for paper feeding roller in an automatic paper feeder according to a first embodiment of the present invention.

Please refer to FIG. 3 that is a sectioned side view of a pressure-adjustable mechanism for paper feeding roller in an automatic paper feeder according to a first embodiment of the present invention. In this embodiment, the pressure-adjustable mechanism mainly includes a movable paper tray 4 on which a plurality of paper sheets 40 may be stacked. The movable paper tray 4 is rotatably supported on a supporting shaft 41 mounted to a fixed position in the automatic paper feeder, so that a length of the movable paper tray 4 to the left side of the supporting shaft 41, as viewed in front of FIG. 3, forms a paper supporting end 4a, and an end of the paper tray 4 opposite to the end 4a forms a paper-out end 4b.

A paper feeding roller 5 is located downstream closely below the paper-out end 4b of the movable paper tray 4, and a paper separating mechanism 61 and a paper separating plate 62 are located downstream closely above the paper-out end 4b of the movable paper tray 4, so that a proper gap is provided between the paper separating plate 62 and the paper feeding roller 5 for a sheet of paper 40 to pass therethrough.

In the present invention, there is a paper tray pressure detecting mechanism located below the movable paper tray 4 for detecting an overall weight of paper sheets 40 stacked on the movable paper tray 4. In the first embodiment of the present invention, the paper tray pressure detecting mechanism includes a spring element 7 having an upper end pressed against a bottom surface of the paper supporting end 4a of the movable paper tray 4.

A roller pressure adjusting mechanism is also located below the movable paper tray 4 for adjusting a pressure between the paper feeding roller 5 and the paper separating plate 62. The roller pressure adjusting mechanism includes a pressure transfer member 81 having a first end 81a, against which a lower end of the spring element 7 is pressed. A pressure sensed by the spring element 7 of the paper tray pressure detecting mechanism is transferred in a first direction as indicated by the arrow I to the first end 81a of the pressure transfer member 81.

A supporting shaft 82 is located at a lower side of the pressure transfer member 81 to serve as a fulcrum for the pressure transfer member 81 to function like a lever. A second end 81b of the pressure transfer member 81 is in the vicinity of the paper feeding roller 5 and has a paper feeding roller displacement element 83 provided thereat. With these arrangements, the pressure of the paper tray 4 transferred in the first direction I to the pressure transfer member 81 is further transferred in a second direction II from the second end 81b of the pressure transfer member 81 to the paper feeding roller 5 via the paper feeding roller displacement element 83, so that the paper feeding roller 5 is displaced by a certain degree to adjust a pressure between the paper feeding roller 5 and the paper separating plate 62.

In the pressure-adjustable mechanism of the present invention, there is provided with a paper pressing mechanism 42 located over a top of the movable paper tray 4 to apply a proper pressure on the paper sheets 40 stacked on the movable paper tray 4, and a stopping plate 43 located above the paper-out end 4b of the movable paper tray 4 and between the paper pressing mechanism 42 and the paper separating plate 62 to provide a first-stage stopping of the paper sheets 40 on the movable paper tray 4, so that only one or a few lowermost sheets are admitted into the gap between the paper feeding roller 5 and the paper separating plate 62.

With the above arrangements, a pressure from the weight of paper sheets 40 stacked on the movable paper tray 4 is detected by the spring element 7 and transferred to the pressure transfer member 81 and the paper feeding roller displacement element 83, so as to change the pressure between the paper feeding roller 5 and the paper separating plate 62 and to adjust the paper feeding angle of the paper tray 4 enabling the paper feeding roller 5 and the paper separating plate 62 to maintain a proper frictional pressure difference between them and accordingly keep good paper separating function of the automatic paper feeder.

Figure 4:
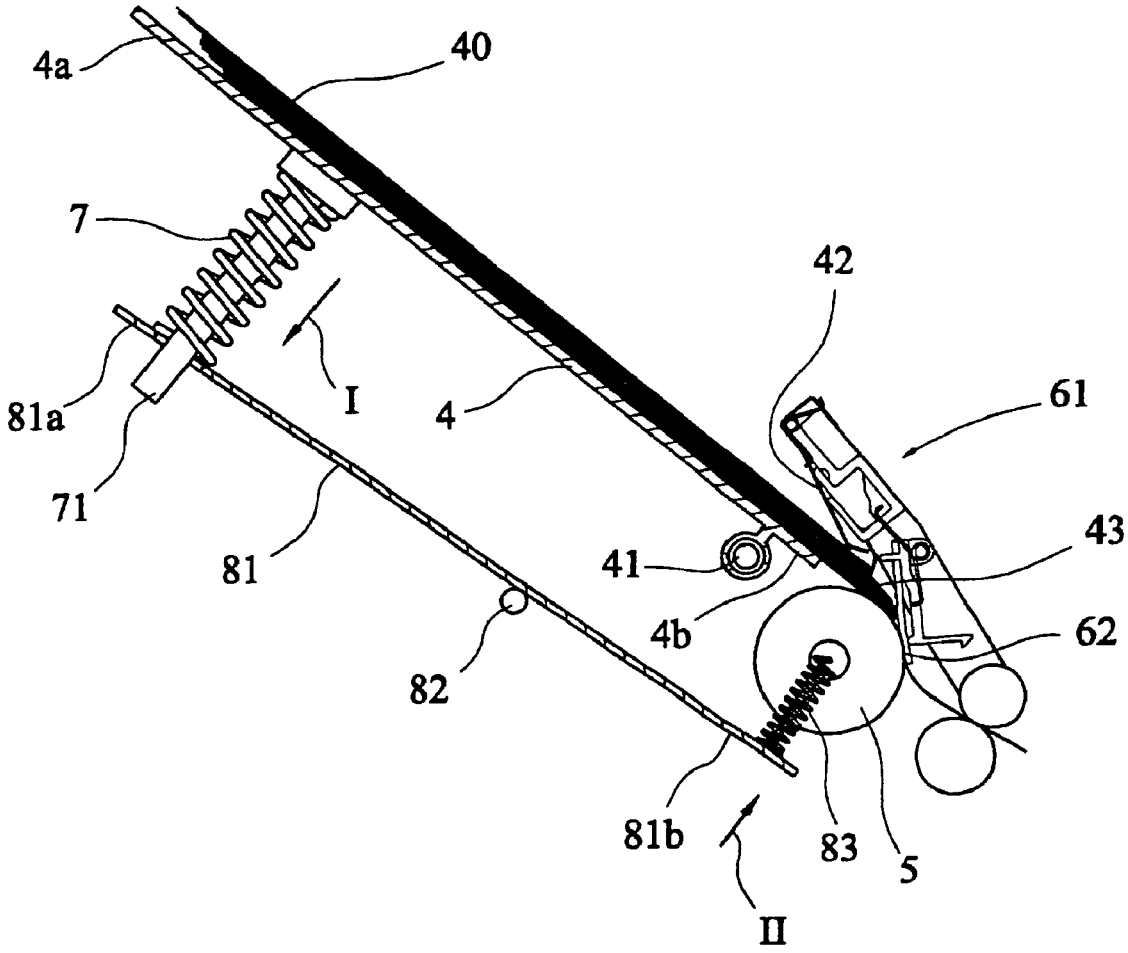
FIG. 4 is a sectioned side view of a pressure-adjustable mechanism for paper feeding roller in an automatic paper feeder according to a second embodiment of the present invention.

FIG. 4 is a sectioned side view of a pressure-adjustable mechanism for paper feeding roller in an automatic paper feeder according to a second embodiment of the present invention. The second embodiment of the present invention has a structure generally similar to that of the first embodiment shown in FIG. 3, except that the paper tray pressure detecting mechanism further includes a guiding post 71 provided at the bottom side of the movable paper tray 4 to extend toward the pressure transfer member 81 by a proper distance. The spring element 7 is put around the guiding post 71 to avoid undesired deviation of the spring element 7 when the same is compressed or extended due to changes in the weight of paper sheets 40 on the movable paper tray 4.

Figure 5:
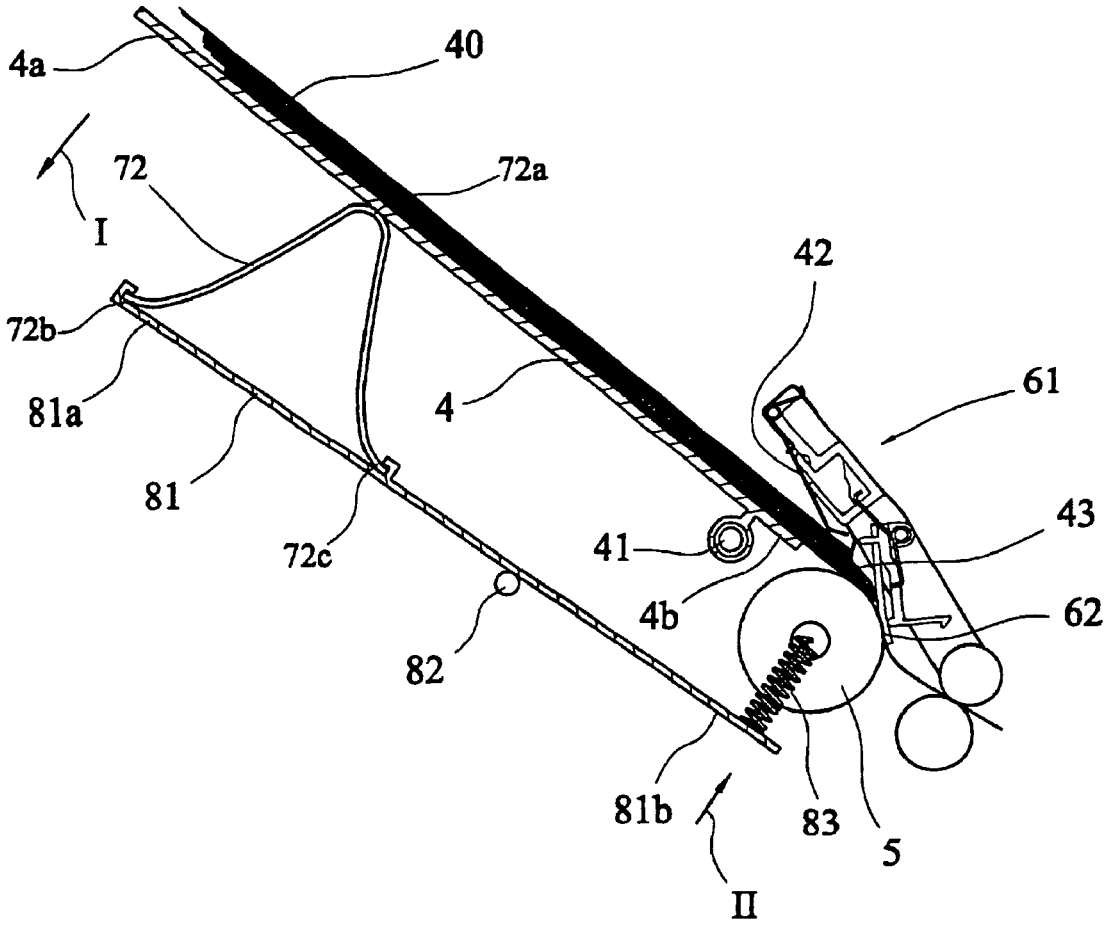
FIG. 5 is a sectioned side view of a pressure-adjustable mechanism for paper feeding roller in an automatic paper feeder according to a third embodiment of the present invention.

FIG. 5 is a sectioned side view of a pressure-adjustable mechanism for paper feeding roller in an automatic paper feeder according to a third embodiment of the present invention. The third embodiment of the present invention also has a structure generally similar to that of the first embodiment shown in FIG. 3, except that the paper tray pressure detecting mechanism includes an arched leaf spring 72 to replace the spring element 7. An apex 72a of the arched leaf spring 72 is pressed against the bottom side of the movable paper tray 4, and two free ends 72b, 72c of the arched leaf spring 72 are pressed against the pressure transfer member 81. The arched leaf spring 72 functions equally well as the spring element 7 to transfer the pressure of paper on the movable paper tray 4 to the pressure transfer member 81.

Figure 6:
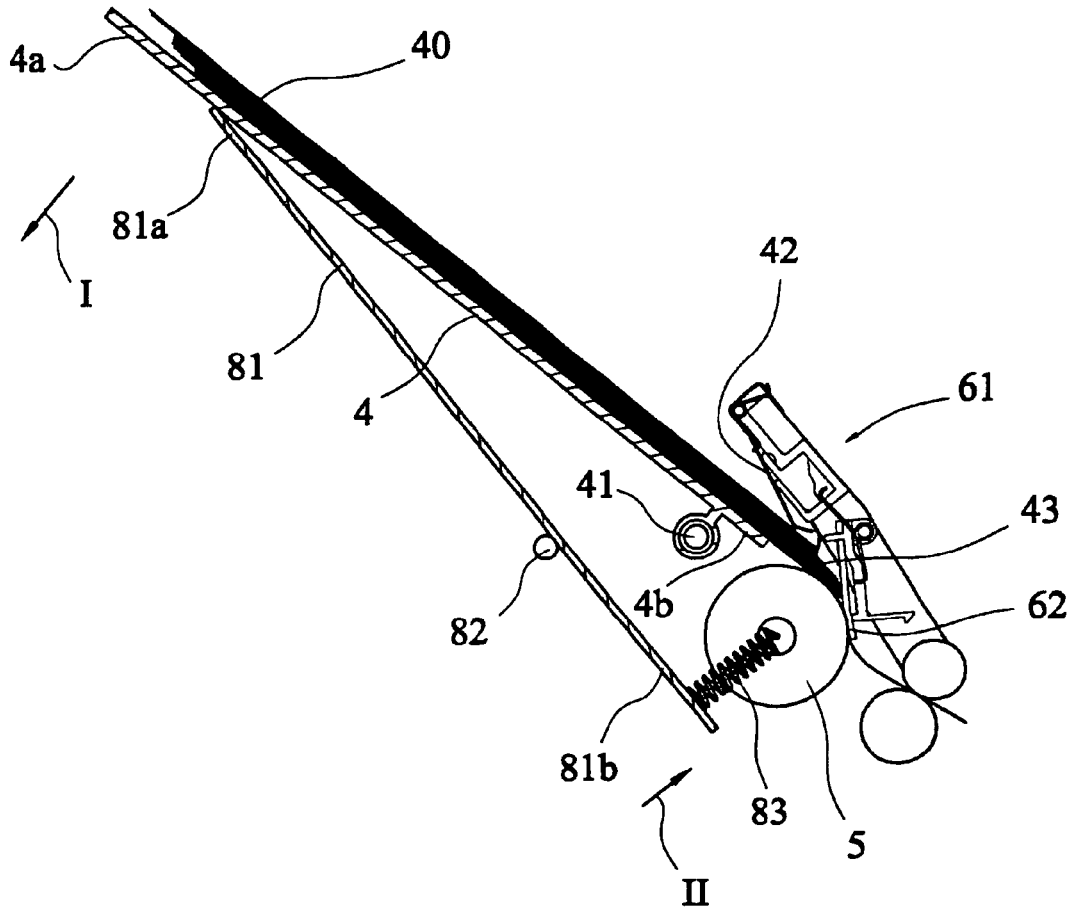
FIG. 6 is a sectioned side view of a pressure-adjustable mechanism for paper feeding roller in an automatic paper feeder according to a fourth embodiment of the present invention.

FIG. 6 is a sectioned side view of a pressure-adjustable mechanism for paper feeding roller in an automatic paper feeder according to a fourth embodiment of the present invention. The fourth embodiment of the present invention also has a structure generally similar to that of the first embodiment shown in FIG. 3, except that the paper tray pressure detecting mechanism does not include any spring element and the first end 81a of the pressure transfer member 81 is directly abutted on the bottom side of the movable paper tray 4. In this manner of arrangement, the weight of paper on the movable paper tray 4 could similarly be transferred to the paper feeding roller 5 via the pressure transfer member 81 and the paper feeding roller displacement element 83, causing the paper feeding roller 5 to displace by an amount and therefore adjust the pressure between the paper feeding roller 5 and the paper separating plate 62.

It is apparent that although the present invention is illustrated with the description of a preferred embodiments of the system in accordance with the present invention, it is contemplated that there may be changes and modifications in the described embodiment and examples that can be carried out without departing from the scope of the invention which is intended to be limited only by the appended claims

What is claimed is:

[1. A pressure-adjustable mechanism for a paper feeding roller in an automatic paper feeder, comprising:

a movable paper tray being rotatably supported on said automatic paper feeder, said movable paper tray having a paper-out end and a paper supporting end on which a plurality of paper sheets are stacked;

a paper feeding roller located downstream closely below said paper-out end of said movable paper tray;

a paper separating plate located downstream closely above said paper-out end of said movable paper tray;

a paper tray pressure detecting mechanism for detecting a pressure applied thereon by a weight of said paper sheets stacked on said movable paper tray; and a roller pressure adjusting mechanism for adjusting a pressure between said paper feeding roller and said paper separating plate;

whereby said pressure from the weight of said paper stacked on said movable paper tray detected by said paper tray pressure detecting mechanism is transferred to said roller pressure adjusting mechanism for the same to change said pressure between said paper feeding roller and said paper separating plate and to adjust a paper feeding angle of said movable paper tray, enabling smooth sending of a lowermost sheet of said paper sheets on said movable paper tray out of said paper-out end.]

[2. The pressure-adjustable mechanism as claimed in claim 1, wherein said roller pressure adjusting mechanism comprises:

a pressure transfer member for transferring said pressure detected by said paper tray pressure detecting mechanism, and having a fulcrum, a first end, and a second end;

a supporting shaft pressed against said fulcrum of said pressure transfer member for the latter to work like a lever; and a paper feeding roller displacement element being located at said second end of said pressure transfer member corresponding to said paper feeding roller, and receiving said pressure transferred by said pressure transfer member to displace said paper feeding roller by an amount, so as to adjust said pressure between said paper feeding roller and said paper separating plate.]

[3. The pressure-adjustable mechanism as claimed in claim 2, wherein said paper tray pressure detecting mechanism is a spring element having an end pressed against a bottom side of said movable paper tray and another end pressed against said first end of said pressure transfer member, allowing said pressure from said paper sheets stacked on said movable paper tray to transfer to said pressure transfer member via said spring element.]

[4. The pressure-adjustable mechanism as claimed in claim 2, wherein said paper tray pressure detecting mechanism is an arched leaf spring having an apex pressed against a bottom side of said movable paper tray and two free ends pressed against said first end of said pressure transfer member, allowing said pressure from said paper sheets stacked on said movable paper tray to transfer to said pressure transfer member via said arched leaf spring.]

[5. The pressure-adjustable mechanism as claimed in claim 2, wherein said paper tray pressure detecting mechanism comprises:

a guiding post being provided at a bottom side of said movable paper tray to extend toward said pressure transfer member by a predetermined distance; and a spring element put around said guiding post;

said spring element having an end pressed against said bottom side of said movable paper tray and another end pressed against said first end of said pressure transfer member, allowing said pressure from said paper sheets stacked on said movable paper tray to transfer to said pressure transfer member via said spring element.]

[6. The pressure-adjustable mechanism as claimed in claim 2, wherein said first end of said pressure transfer member is directly pressed against a bottom side of said movable paper tray to transfer said pressure detected by said paper tray pressure detecting mechanism.]

[7. The pressure-adjustable mechanism as claimed in claim 1, further comprising a paper pressing mechanism located over a top of said movable paper tray to apply a proper pressure on said paper sheets stacked on said movable paper tray.]

[8. The pressure-adjustable mechanism as claimed in claim 1, further comprising a stopping plate located above said paper-out end of said movable paper tray and between said paper pressing mechanism and said paper separating plate to stop said paper sheets stacked on said movable paper tray, so that only one or a few lowermost sheets of said stacked paper sheets are admitted into a gap between said paper feeding roller and said paper separating plate.]

*9. An apparatus, comprising:*

*a tray configured to pivot in accordance with an amount of pressure exerted by a stack of paper;*

*a paper separating plate;*

*a feeding roller positioned adjacent to the paper separating plate; and*

*a pressure adjusting mechanism configured to pivot in a same direction as the tray and to vary an amount of pressure applied between the paper separating plate and the feeding roller in accordance with the amount of pressure exerted on the tray by the stack of paper;*

*wherein the pressure adjusting mechanism further comprises a pressure transfer mechanism having an upstream end coupled to an upstream end of the tray and a downstream end coupled to the feeding roller.*

*10. An apparatus, comprising:*

*a tray configured to support a stack of paper;*

*a feeding roller configured to receive multiple papers from the stack of paper on the tray and separate out individual papers from the received multiple papers; and*

*a pressure adjusting mechanism configured to vary an amount of pressure applied to the feeding roller according to an amount of pressure exerted on the tray by the stack of paper, wherein the pressure adjusting mechanism comprises:*

*an elongated pressure transfer mechanism having a first end positioned below an upstream end of the tray and a second end positioned below the feeding roller; and*

*a pressure detection mechanism having a top end positioned against the upstream end of the tray and a bottom end positioned against the first end of the elongated pressure transfer mechanism.*

*11. The apparatus according to claim 10 wherein the pressure transfer mechanism comprises a first end that abuts up against a bottom side of the tray and a second end coupled to a roller displacement element.*

*12. The apparatus according to claim 10 wherein the pressure transfer mechanism comprises:*

*a lever having a first end coupled to the pressure detection mechanism;*

*a pivot member supporting the lever; and*

*a roller displacement element coupled between a second end of the lever and the feeding roller.*

*13. The apparatus according to claim 12 wherein:*

*the pressure detection mechanism is configured to transfer at least some of the pressure exerted on the tray by the stack of paper to the first end of the lever; and*

*the lever is configured to pivot about the pivot member in response to the transferred pressure and apply at least some of the transferred pressure to the feeding roller through the roller displacement element.*

*14. An apparatus, comprising:*

*a tray;*

*a feeding roller positioned next to the tray; and*

*a pressure adjusting mechanism configured to adjust an amount of document pressure applied by the feeding roller to documents moved from the tray according to an amount of pressure applied on the tray by documents residing on the tray, wherein the pressure adjusting mechanism comprises:*

*a pressure transfer mechanism configured to transfer at least some of the document pressure to the feeding roller, and*

*a pressure detection mechanism comprising an arched leaf spring having an apex pressed against a bottom side of the tray and at least two free ends pressed against the pressure transfer mechanism.*

*15. An apparatus, comprising:*

*a tray;*

*a feeding roller positioned next to the tray; and*

*a pressure adjusting mechanism configured to adjust an amount of pressure applied to the feeding roller according to an amount of document pressure applied on the tray by documents residing on the tray, wherein the pressure adjusting mechanism comprises:*

*a pressure transfer mechanism configured to transfer at least some of the document pressure to the feeding roller, and*

*a pressure detection mechanism comprising a spring positioned between the tray and the pressure transfer mechanism and a guide post positioned inside of the spring, the spring having a first end attached on a bottom side of the tray and a second end extending toward the pressure transfer mechanism.*

*16. An apparatus, comprising:*

*a tray having a paper in-feed end and a paper out-feed end;*

*a feeding roller located at the paper out-feed end of the tray; and*

*a pressure adjusting mechanism comprising:*

*a pressure transfer mechanism having a first end positioned below the paper in-feed end of the tray; and*

*a pressure detection mechanism having a first end coupled to the paper in-feed end of the tray and a second end coupled to the first end of the pressure transfer mechanism;*

*wherein a second end of the pressure transfer mechanism is coupled to the feeding roller.*

*17. A document feeder, comprising:*

*means for rotating a document tray;*

*means for detecting a pressure applied against an upstream end of the document tray; and*

*means for rotating a pressure transfer mechanism below and in a same direction as the document tray responsive to the pressure applied against the upstream end of the document tray.*

*18. The document feeder according to claim 17 wherein the pressure transfer mechanism comprises an upstream end coupled underneath the upstream end of the document tray and a downstream end coupled to a document feeding roller.*

*19. The document feeder according to claim 17 wherein said means for detecting is located between the upstream end of the document tray and the upstream end of the pressure transfer mechanism.*

*20. An apparatus, comprising:*

*a document holder configured to hold a stack of documents;*

*a document feeder configured to receive the stack of documents from the document holder and separate out individual documents from the received stack of documents, wherein the document feeder further comprises a roller configured to receive the stack of documents from the document holder, separate out individual documents from the stack of documents, and output the separated individual documents from the document feeder;*

*an adjustment device configured to vary an angle that the stack of documents are fed into the document feeder according to an overall weight of the stack of documents in the document holder; and*

*a pressure transfer mechanism adjusting an amount of pressure the roller applies against a separating plate according to the overall weight of the stack of documents in the document holder, wherein the pressure transfer mechanism comprises an elongated pressure transfer member that extends underneath substantially the entire document holder, and a spring positioned between an upstream end of the document holder and an upstream end of the pressure transfer member.*

*21. The apparatus according to claim 20 wherein the pressure transfer mechanism comprises a lever having a first end coupled to the spring, a middle portion pivoting about a pivot member, and a second end coupled to the roller.*

*22. An apparatus, comprising:*

*a rotatably supported document tray having a top end and a document out end;*

*a document feeding roller positioned proximate to the document out end of the document tray;*

*a pressure detecting mechanism configured to detect pressure from documents in the document tray; and*

*a pressure adjusting mechanism comprising a first end coupled through the pressure detecting mechanism to the top end of the document tray and a second end coupled to the document feeding roller.*

*23. The apparatus according to claim 22 wherein the pressure adjusting mechanism is located underneath the document tray and configured to rotate in a same direction as the document tray.*

*24. A pressure-adjustable mechanism for a paper feeder, comprising:*

*a paper tray rotatably supported on the paper feeder, the paper tray having an upstream end configured to hold a stack of paper sheets and a downstream paper-out end configured to output the stack of paper sheets;*

*a paper feeding roller positioned below the downstream paper-out end of the paper tray;*

*a paper separating plate positioned adjacent to the paper feeding roller;*

*a paper tray pressure detecting mechanism configured to detect a pressure applied on the paper tray by the stack of paper sheets held in the paper tray; and*

*a roller pressure adjusting mechanism configured to transfer pressure detected by the paper tray pressure detecting mechanism to the paper feeding roller, wherein the roller pressure adjusting mechanism comprises an elongated pressure transfer member extending continuously from underneath the upstream end of the paper tray to underneath the downstream paper-out end of the paper tray.*

*25. The pressure-adjustable mechanism according to claim 24, wherein the roller pressure adjusting mechanism comprises:*

*a supporting shaft pressed against a fulcrum of the pressure transfer member; and*

*a paper feeding roller displacement element coupled between a downstream end of the pressure transfer member and the paper feeding roller.*

*26. The pressure-adjustable mechanism according to claim 24, wherein the paper tray pressure detecting mechanism is a spring element having an upper end pressed against a bottom side of the paper tray and a lower end pressed against an upstream end of the pressure transfer member.*

*27. The pressure-adjustable mechanism according to claim 24, wherein the pressure transfer member is positioned directly against a bottom side of the upstream end of the paper tray.*

*28. The pressure-adjustable mechanism according to claim 24, comprising a paper pressing mechanism positioned over the paper tray and configured to apply pressure on the stack of paper sheets held by the paper tray.*

*29. The pressure-adjustable mechanism according to claim 28, comprising a stopping plate positioned between the paper pressing mechanism and the paper separating plate, the stopping plate configured to stop the stack of paper sheets on the paper tray so that only one or a few lowermost sheets from the stack of paper sheets are admitted into a gap between the paper feeding roller and the paper separating plate.*

*30. An apparatus, comprising:*

*a movable paper tray having a paper supporting end and a paper-out end;*

*a paper feeding roller positioned next to the paper-out end of the movable paper tray;*

*a paper separating plate positioned next to the paper feeding roller;*

*a paper tray pressure detecting mechanism configured to detect pressure exerted on the movable paper tray; and*

*a roller pressure adjusting mechanism comprising a pressure transfer member configured to transfer pressure detected by the paper tray pressure detecting mechanism to the paper feeding roller, wherein the paper tray pressure detecting mechanism is an arched leaf spring having an apex pressed against a bottom side of the movable paper tray and two free ends pressed against the pressure transfer member.*

*31. An apparatus, comprising:*

*a movable paper tray having a paper supporting end and a paper-out end;*

*a paper feeding roller positioned next to the paper-out end of the movable paper tray;*

*a paper separating plate positioned next to the paper feeding roller;*

*a paper tray pressure detecting mechanism configured to detect pressure exerted on the movable paper tray; and*

*a roller pressure adjusting mechanism comprising a pressure transfer member configured to transfer pressure detected by the paper tray pressure detecting mechanism to the paper feeding roller, wherein the paper tray pressure detecting mechanism comprises:*

*a guiding post positioned on a bottom side of the movable paper tray and extending toward the pressure transfer member; and*

*a spring element positioned around the guiding post and having a first end pressed against the bottom side of the movable paper tray and a second end pressed against the pressure transfer member.*

*32. An apparatus, comprising:*

*a movable paper tray having a paper supporting end and a paper-out end;*

*a paper feeding roller positioned adjacent to the paper-out end of the movable paper tray;*

*a paper separating plate positioned adjacent to the paper feeding roller;*

*a paper tray pressure detecting mechanism configured to detect pressure exerted on the movable paper tray;*

*a roller pressure adjusting mechanism configured to transfer pressure detected by the paper tray pressure detecting mechanism to the paper feeding roller; and*

*a stopping plate positioned above the paper-out end of the movable paper tray and positioned between a paper pressing mechanism and the paper separating plate, the stopping plate configured to stop paper sheets stacked on the movable paper tray so that only one or a few lowermost sheets of the stack of paper sheets are admitted into a gap between the paper feeding roller and the paper separating plate.*

* * * * *